United States Patent [19]

O'Hanlon

[11] 4,216,914
[45] Aug. 12, 1980

[54] MATERIAL SPREADER

[75] Inventor: Dudley J. O'Hanlon, Winfield, Iowa

[73] Assignee: Winfield Agri-Builders Company, Winfield, Iowa

[21] Appl. No.: 41,776

[22] Filed: May 23, 1979

[51] Int. Cl.² .............................................. B65G 65/32
[52] U.S. Cl. .................... 239/666; 239/683; 239/687; 406/162; 414/301
[58] Field of Search .............. 239/651, 666, 681, 683, 239/687, 500, 522; 414/301, 299; 406/162, 163; 193/3; 198/536; 222/239, 242

[56] References Cited

U.S. PATENT DOCUMENTS

| | | | |
|---|---|---|---|
| 1,795,988 | 3/1931 | Adams | 414/299 |
| 2,557,977 | 6/1951 | Knoff | 406/162 |
| 3,780,887 | 12/1973 | Bottoms | 414/299 |
| 3,966,124 | 6/1976 | Sukup | 239/687 |
| 4,040,529 | 8/1977 | Wurdeman et al. | 414/301 |

*Primary Examiner*—Robert B. Reeves
*Assistant Examiner*—Michael J. Forman

*Attorney, Agent, or Firm*—Rudolph L. Lowell; G. Brian Pingel

[57] ABSTRACT

The spreader assembly is located below the central fill opening in the roof of a circular grain or storage bin for evenly distributing the grain over the floor area of the bin. Grain is directed downwardly into a rotatable funnel shaped hopper, the bottom end of which is rigidly secured to the upper end of a downwardly inclined longitudinally adjustable distributor member provided on the top surface thereof with side by side longitudinally extended trough means of progressively decreasing length and width from one side of the distributor member to the opposite side thereof. On reaching the lower ends of the trough means the downwardly moving grain is deflected toward the opposite side of the distributor member for discharge into the bin. The grain deflecting action rotates the funnel member and distributor member as a unit at a speed of rotation which is in direct response to the volume rate of material being supplied to the hopper member.

5 Claims, 7 Drawing Figures

U.S. Patent    Aug. 12, 1980    Sheet 1 of 2    4,216,914
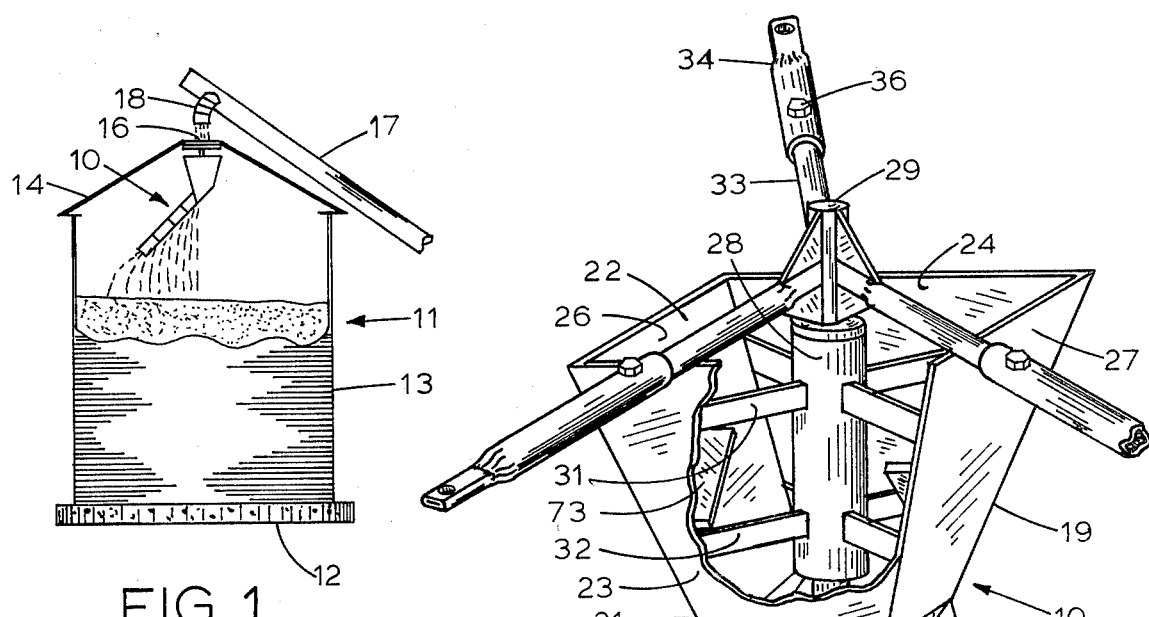
FIG. 1
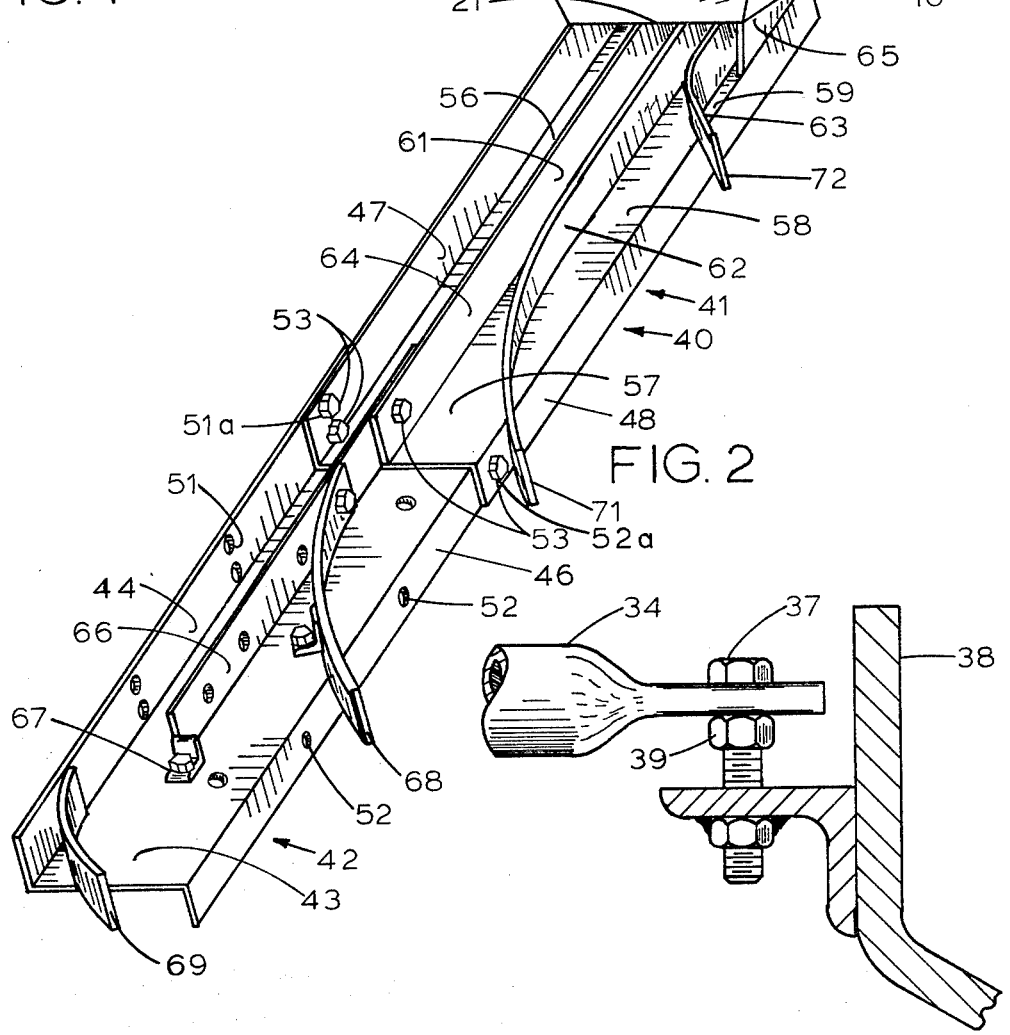
FIG. 2
FIG. 3

U.S. Patent  Aug. 12, 1980  Sheet 2 of 2  4,216,914
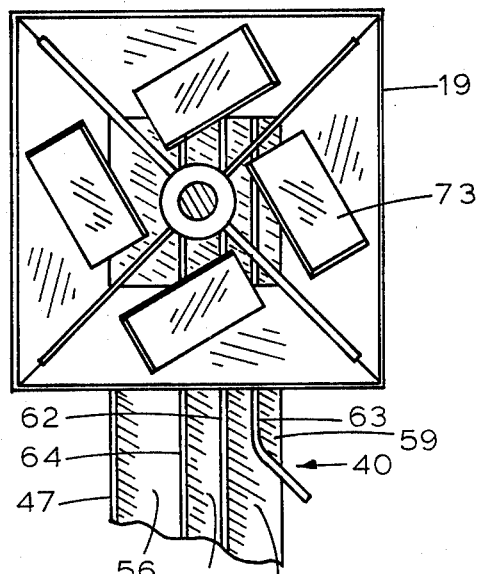
FIG.4
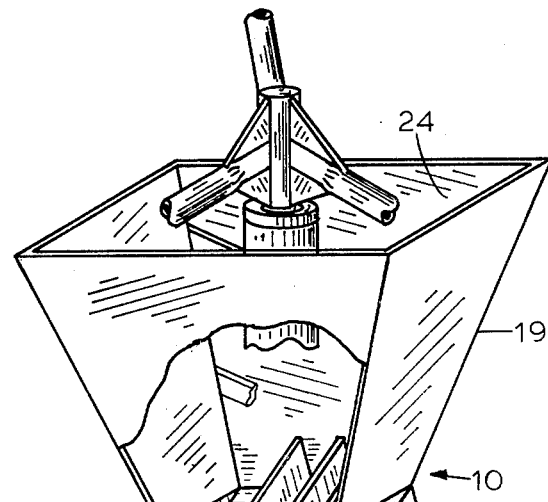
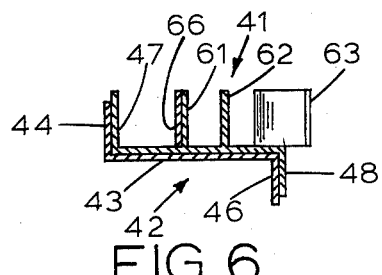
FIG.6
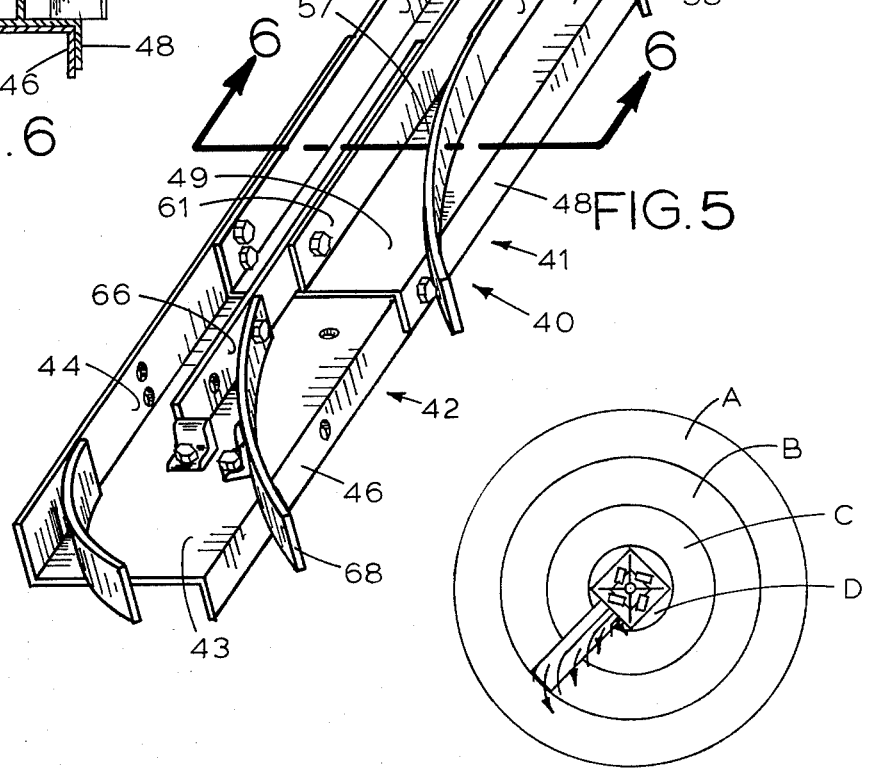
FIG.5
FIG.7

MATERIAL SPREADER

BACKGROUND OF THE INVENTION

Spreader assemblies of the prior art such as shown for example in U.S. Pat. Nos. 3,248,117 and 3,282,591 include stationery hoppers of a funnel shape for receiving the grain to be distributed within a storage bin. The distributor or scattering assembly receives the grain from the lower end of the hopper for scattering about the bin. A motor in or on the hopper rotates the scattering assembly at various speeds with such assembly being axially tiltable relative to its vertical axis of rotation in response to the rotational speed thereof. The tilt position and rotational speed of the scattering assembly determines the pattern of grain distribution.

In the spreader of U.S. Pat. No. 3,248,117, the scattering assembly at the discharge portion thereof is provided with adjustable vanes to further vary the distributing pattern. Since these spreaders are dependent upon centrifugal action for scattering the grain, the larger particles of grain are distributed peripherally of the bin while smaller particles along with fines and like refuse material are distributed centrally of the bin. Uniformity of material dispersion is thus impaired even though uniformity in the level of grain in the bin may be satisfactory. This disparity of grain density transversely of the bin appreciably shortens the period during which the grain can be stored without spoilage.

SUMMARY OF THE INVENTION

The spreader assembly is of a simple and compact construction and economical in cost. The grain to be distributed provides, by gravitational flow, the power required to rotate the distributor member so that electrical power or the like is completely eliminated. The distributor member and funnel shaped hopper member are of a unit rigid assembly and uniform grain distribution over the floor area of the bin is obtained by varying the grain supplied to the distributor over the width thereof into troughs of variable lengths. The volume of grain handled by each trough is determined by the floor area of the bin over which such trough is to distribute the grain, with the distributor and in turn the troughs being longitudinally extensible and retractable to accommodate bins of varying diameters. However, regardless of the bin size, the relative volume of grain to be spread over designated annular floor portions of the same width radially of the bin remains substantially the same for bins of different diameters. On length adjustment of the distributor for bin size, the spreader assembly is self-operated at a relatively slow rate of speed in the neighborhood of five rpm to ten rpm so as to efficiently spread grain uniformly of the bin floor area both as to grain level and density. In other words, the grain admitted to the upper end of the troughs is of like density and character which remains unaltered in the slow rotation of the spreader assembly during the distributing operation.

BRIEF DESCRIPTION OF THE DRAWINGS

FIG. 1 is a diagrammatic illustration of a bin showing the material spreader of this invention in assembly relation therewith;

FIG. 2 is an enlarged perspective view of the spreader assembly with a part of the hopper member broken away for the purpose of clarity;

FIG. 3 is an enlarged sectional detail view showing one of the supporting arms for the distributor assembly adjustably mounted on the side wall of the bin fill opening;

FIG. 4 is a plan view of the hopper member showing grain deflector members and the arrangement of trough members over the entire area of the hopper bottom portion;

FIG. 5 is illustrated similarly to FIG. 2 and shows the distributor member in a retracted adjusted position relative to the showing thereof in FIG. 2; and with a portion of the hopper member and its rotatable support being broken away to more clearly show the manner of attachment of the hopper member with the distributor member;

FIG. 6 is a sectional view taken on the line 6—6 in FIG. 5; and

FIG. 7 is a diagrammatic illustration of the distributing pattern of the spreader assembly of this invention.

DETAILED DESCRIPTION OF THE INVENTION

With reference to the drawings, the material spreader of this invention, indicated generally as 10 in FIG. 1, is shown in assembly relation with a bin 11 of cylindrical shape having a floor area 12 defined by a side wall 13. A conical roof 14 for the bin 11 has a central circular fill opening or material inlet 16. Material such as grain may be supplied to the inlet 16 by an auger type feed conveyor 17 that has an outlet 18 arranged for discharge of material directly into the inlet 16.

The material spreader 10 (FIGS. 1 and 2) includes a chute or hopper member 19 of a funnel shape having a lower discharge end 21 and an upper inlet end 22 located immediately below the fill opening 16. The hopper 19 is of a square shape in transverse cross section so as to have what will be referred to for convenience as a front wall 23, a rear wall 24 and side walls 26 and 27. Extended axially within the chute 19 (FIG. 2) is a thrust bearing member 28 for rotatably supporting a shaft 29. Upper and lower sets of four brace members 31 and 32, respectively, extend radially from the bearing 28 for securement of their outer ends within associated corners of the chute 19. The shaft 29 projects upwardly from the bearing 28 for securement thereto of radially extended connecting members 33, illustrated as three in number. Each connecting member 33 has an outer telescoping section 34 (FIGS. 2 and 3) for adjustment radially of the shaft 29 to accommodate bin openings 16 of varying diameter. A telescoping section 34 is locked in an extended position relative to connecting member 33 by a lock or friction screw 36. Each telescoping section 34 on a connecting member 33 carries a nut and bolt assembly 37 which is mounted on the side wall 38 of the fill opening 16 for relative adjustable vertical movement of the outer ends of the connecting members 33. Vertical adjustment of a connecting member 33 relative to the fill opening side wall 38 is maintained by a locking nut 39. Relative vertical adjustment of the connecting members 33 by the bolt assemblies 37 is utilized to provide for the location of the upper side of the chute 19 in a substantially horizontal plane.

Rigidly secured to and projected downwardly and forwardly from the hopper member 19 is a longitudinally adjustable distributor member 40 which is comprised of upper and lower elongated sections 41 and 42, respectively, similar in size and shape with their adjacent ends in a nested mating engagement (FIG. 6). The distributor member 40 is thus adjustable to a desired overall length, for a purpose to later appear, by merely extending and retracting the lower distributor section 42 relative to the upper distributor section 41 and then locking the lower section in an adjusted position.

As shown in FIGS. 5 and 6, the lower distributor section 42 consists of a flat body member 43 having an upstanding flange 44 along one side thereof and a downwardly projected flange 46 extended along the opposite side thereof. In like manner, the upper distributor section 41 has a flat body member 49 with an upstanding flange 47 and a depending flange 48 movable in side by side engagement with the flanges 44 and 46, respectively, of the lower distributor section 42 when such sections are in longitudinal alignment. The flanges 44 and 46 of the lower distributor section 42 are formed with transversely opposite holes 51 and 52, respectively, (FIG. 2) spaced longitudinally of the section 42. In one embodiment of the invention each distributor section 41 and 42 is about three and one-half feet long and the holes 51 and 52 are spaced apart at about one foot intervals. A single set of corresponding holes 51a and 52a are formed in the flanges 47 and 48, respectively, of the upper distributor section 41. Bolts 53 are inserted through the openings 51a and 52a and through selected holes 51 and 52, respectively, for locking the sections 41 and 42 in an adjusted position. As illustrated in FIG. 2, the distributor member 40 is extended to a maximum length of about six feet from the front wall 23 of the hopper 19 for use of the spreader assembly in bins 11 of thirty-six feet in diameter. In its retracted position the distributor member is about four feet long to accommodate bins of eighteen feet in diameter.

At any adjusted length of the distributor member 40 the top surface thereof is formed with a series of four trough members 56, 57, 58 and 59 which from the upstanding flange sides of the sections 41 and 42 progressively decrease in length and in width transversely of the distributor member to the depending flange side of the sections. In this respect, and with reference to FIGS. 2 and 5, it is seen that at any adjusted length of the distributor member 39 all of the trough members 56, 57, 58 and 59 have their outlet or lower ends open to and directed toward the depending flange sides of the sections 41 and 42.

In the embodiment of the invention above referred to, the upstanding flanges on the distributor sections 41 and 42 and the partition or separating walls 61, 62 and 63 for the trough members are about four inches high. The rear wall 24 (FIG. 5) projects below the outlet end 21 of the hopper 19 a distance substantially equal to the height of the flanges 44 and 46 for securement directly to the flat body portion 49 of the upper section 41. It will also be seen that the side wall 27 terminates in a triangular connecting section 65 for securement directly to the flat body portion 49. In this respect, it is to be noted that the areas covered by the trough members 56–59, inclusive, are co-extensive with the area of the upper surface of the distributor member 40 so that the top end portions of the trough members cover the entire area defined by the lower or discharge end of the hopper 19.

The upper surfaces of the distributor sections 41 and 42 are thus common to and form the bottom walls of the troughs 56, 57, 58 and 59. The side walls of the trough 56 are comprised of the upright flanges 44 and 47 on the sections 42 and 41, respectively, and the partition wall 61 that is common to the troughs 56 and 57. In addition to the partition wall 61, the trough 57 has the side or partition wall 62, which is common to the trough 58. The side or partition wall 63 is common to the troughs 58 and 59. The triangular section 65 on the side wall 27 constitutes the outer side wall for the trough 59.

The side walls of the trough 56 are adjustable as to length while the trough sidewalls 62 and 63 are of a fixed length and secured to the top surface of the upper distributor member 41. The side or partition wall 61 common to the troughs 56 and 57 is comprised of an upper portion 64 fixed to and co-extensive in length with the upper distributor section 41 and a lower portion 66, arranged in a side by side relation with the upper portion 64 for extendible and retractable movement relative thereto to an adjusted position corresponding to an adjusted length of the distributor member 40. The lower portion 66 is releasably secured at 67 to the lower distributor section 42 at a position vertically spaced above the surface thereof for a clearance movement relative to the upper distributor section 41.

An upright arcuate deflector member 68 is adjustably secured to the side wall portion 66 and to the distributor section 42 for movement to an adjusted position in conformance with the adjusted length of the distributor member 39, as illustrated in FIGS. 2 and 5. A deflector member 69 for the trough 56 is fixed to the upright flange 44 and to the top surface of the lower distributor section 42. The lower ends of the trough walls 62 and 63 terminate in deflector portions 71 and 72, respectively.

As best shown in FIGS. 4 and 5, the upper or grain receiving end portions of the troughs 56, 57, 58 and 59 are located within and cover the entire area of the lower or discharge end of the hopper 19. Thus all portions of grain from the hopper are received within the trough members in varying amounts proportional to that area of a trough located within the cross sectional area of the lower end of the hopper 19. Since all of the troughs have longitudinal sections of similar length open to the hopper bottom, the amounts of grain received by the troughs varies with the width of a trough, which in turn vary with the location of a trough transversely on the distributor member 40 to provide a desired pattern of grain distribution over the floor area 12 of the bin 11.

Referring to FIG. 7, the diagrammatically illustrated floor area of the bin is divided into four annular sections, A, B, C and D, each of which is of an equal width radially of the bin. In other words, the radius of the bin is divided into four equal lengths and circles are struck at the ends thereof. When so divided, it has been found that about forty-five percent of the grain in the bin is located in section A, about twenty-five to thirty percent in section B, about twenty percent in section C, and from about five to ten percent in section D. This relative percentage of grain distribution occurs generally in bins of varying diameters, and is followed in the relative widths of the troughs 56, 57, 58 and 59 on the distributor 40. Thus, in the embodiment of the invention previously referred to, the distributor sections 41 and 42 are of about a ten inch width, with the trough 56 being about four and a half inches wide, the trough 57 about two and a half inches wide, the trough 58 about two inches wide and the trough 59 about one inch wide.

In use, grain from the conveyor outlet 18 falls within the upper or receiving end of the hopper 19. To disperse this falling grain substantially uniformly over the lower or discharge end 21 of the hopper, each hopper sidewall has secured to the inner surface thereof a deflecting plate or shield 73 (FIGS. 2 and 4). These shields are flat and inclined at an angle of about forty-five degrees, relative to the plane of the upper end 22 of the hopper and with each shield being about four inches long and two inches wide. The downward inclination of a shield is in the direction of rotation of the hopper 19 as effected by the grain flow through the troughs, and against the deflector members at the lower ends of the troughs. The deflectors 73 act to substantially uniformly disperse the grain over the hopper cross-sectional area at the outlet end thereof during each complete revolution of the hopper, regardless of the directional flow of grain from the auger conveyor 17 into the hopper. As a result, each trough 56, 57, 58 and 59, is supplied a portion of grain in proportion to the width thereof located within the hopper confines. Since the grain thus delivered to all of the troughs is of a uniform density, and of like characteristics, such characteristics and density is maintained following the discharge of the grain from the distributor member 40.

The volume of grain distributed is dependent upon the volume of grain admitted into the hopper 19, it being apparent that the greater the amount of grain flowing downwardly of a trough for impact and deflection at the terminal end thereof, the greater the speed of rotation of the hopper and distributor assembly. In the distribution of about five hundred bushels of grain per hour, the speed of rotation of the hopper will be about three rpm and for the spreading of about three thousand bushels per hour, the speed will vary from eight to ten rpm.

As illustrated in FIG. 7, the trough 56 delivers grain to the section A, the trough 57 to the section B, the trough 58 to the section C, and the trough 59 to the section D. On adjustment of the distributor 40 in accordance with the size of the bin to be filled no further attention is required during the filling operation, which takes place efficiently and economically without the use of any power except that provided by the gravity action of the grain flowing downwardly of the distributor member 40. In addition to this economical operation of the spreader assembly, it is apparent that there is attained a distribution of grain not only of substantially equal height throughout the bin, but importantly, of substantially uniform density and characteristics transversely of the bin.

Although the invention has been described with respect to a preferred embodiment thereof, it is to be understood that it is not to be so limited since changes and modifications can be made therein which are within the full intended scope of this invention as defined by the appended claims.

I claim:
1. In a spreader assembly:
 (a) an upright hopper member of a square shape in transverse cross section,
 (b) bearing means within said hopper member for rotation of the hopper member about an upright axis,
 (c) an elongated inclined material distributor member,
 (d) a plurality of side by side longitudinally extended trough means on the top surface of said distributor member,
 (e) means securing the upper end portion of the distributor member to the lower end portion of the hopper member so that the top surface of the distributor member is inclined downwardly relative to a plane extended transversely of the hopper member and normal to the longitudinal axis thereof so that grain from said hopper member flows downwardly through said trough means toward the lower ends thereof,
 (f) said trough means being of progressively shorter length and decreased width from one side toward the other side of said distributor member, and
 (g) means at the lower end of each trough means for deflecting material flowing downwardly therethrough towards said other side of the distributor member, whereby to rotate said hopper member and distributor member as a unit with said other side of the distributor member in a trailing relation.

2. A spreader assembly according to claim 1 wherein:
 (a) said trough means have upper end portions of like length and varying width co-extensive in area with the cross-sectional area of the bottom portion of the hopper member, and
 (b) deflector members projected inwardly from the inner wall surface of the hopper member for continuously dispersing material supplied to the upper end portion of the hopper member over said upper end portions of the trough means.

3. A spreader assembly according to claim 1 wherein:
 (a) the trough means adjacent said one side of the distributor member is of a width to distribute about forty-five percent of the material from said hopper member, the trough means adjacent the other side of the distributor member of a width to distribute about five percent of the material from said hopper member, and said intermediate trough means are of relative widths to distribute the remaining material from the hopper member uniformly between the distributing zones of said side trough means.

4. A spreader assembly according to claim 1 wherein:
 (a) said distributor member is comprised of an upper elongated section and a lower elongated section arranged in a superposed relation for relative extensible and retractable movement to adjusted positions providing for a variation in the length of the distributor member, and
 (b) means for releasably locking said upper section and lower section in an adjusted position therefor.

5. A spreader assembly according to claim 4, wherein:
 (a) the hopper member is secured to the upper section of the distributor member and certain ones of the trough means have the lower ends thereof terminating on the top surface of the lower section of the distributor member, and
 (b) coacting side walls for said certain ones of the trough means arranged in a side by side relation for relative extension and retraction in response to relative movement of the upper section and lower section of the distributor member to an adjusted position therefor.

* * * * *